United States Patent
Ogino et al.

(10) Patent No.: US 10,165,134 B2
(45) Date of Patent: Dec. 25, 2018

(54) IMAGE DISPLAY CONTROL DEVICE AND IMAGE FORMING APPARATUS INCLUDING THE IMAGE DISPLAY CONTROL DEVICE

(71) Applicant: Sharp Kabushiki Kaisha, Osaka-Shi, Osaka (JP)

(72) Inventors: Kumiko Ogino, Osaka (JP); Takaya Nakatani, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 772 days.

(21) Appl. No.: 14/553,054

(22) Filed: Nov. 25, 2014

(65) Prior Publication Data

US 2015/0085309 A1  Mar. 26, 2015

Related U.S. Application Data

(63) Continuation of application No. 13/274,561, filed on Oct. 17, 2011.

(30) Foreign Application Priority Data

Oct. 20, 2010  (JP) ................................. 2010-235676

(51) Int. Cl.
  *H04N 1/00* (2006.01)
  *G06F 3/0488* (2013.01)
  *G06K 15/00* (2006.01)

(52) U.S. Cl.
  CPC ..... *H04N 1/00392* (2013.01); *G06F 3/04883* (2013.01); *G06K 15/005* (2013.01); *H04N 1/00411* (2013.01); *H04N 1/00424* (2013.01); *H04N 1/00448* (2013.01); *H04N 1/00453* (2013.01); *H04N 1/00458* (2013.01); (Continued)

(58) Field of Classification Search
  CPC ............ G06F 3/04883; H04N 1/00411; H04N 1/00424; H04N 1/00448; H04N 1/00453; H04N 1/00458; H04N 1/00474; H04N 1/00482; H04N 2201/0094
  See application file for complete search history.

(56) References Cited

U.S. PATENT DOCUMENTS

2007/0047821 A1  3/2007 Nonaka et al.
2007/0160345 A1* 7/2007 Sakai .................. G06F 3/04817
                                              386/230

(Continued)

FOREIGN PATENT DOCUMENTS

CN  101030056 A   9/2007
CN  101252746 A   8/2008

(Continued)

*Primary Examiner* — Frantz Bataille
(74) *Attorney, Agent, or Firm* — Keating & Bennett, LLP

(57) ABSTRACT

An image forming apparatus includes a control unit equipped with a touch panel display and a control unit-side controller. The control unit includes multiple image display modes supporting functions of editing image data. The control unit side controller includes an image display mode selecting function which, when the user selects a desired function, selects an image display mode that is most suitable for the user's desired function, from the multiple image display modes, in accordance with the user's control operation of selecting a function and displays a frame corresponding to the selected image display mode, on the touch panel display.

13 Claims, 12 Drawing Sheets

(52) U.S. Cl.
CPC ..... *H04N 1/00474* (2013.01); *H04N 1/00482* (2013.01); *H04N 2201/0094* (2013.01)

(56) References Cited

U.S. PATENT DOCUMENTS

| | | | |
|---|---|---|---|
| 2007/0201074 A1 | 8/2007 | Tashiro et al. | |
| 2007/0297010 A1* | 12/2007 | Kotani | G06K 15/00 358/1.18 |
| 2008/0174061 A1* | 7/2008 | Kurita | B65H 45/20 270/45 |
| 2008/0180701 A1 | 7/2008 | Nakagiri et al. | |
| 2008/0207188 A1 | 8/2008 | Ahn et al. | |
| 2008/0301586 A1* | 12/2008 | Ayatsuka | G06F 17/30274 715/840 |
| 2010/0031169 A1* | 2/2010 | Jang | G06F 1/1624 715/760 |
| 2010/0085318 A1 | 4/2010 | Lee et al. | |
| 2010/0118338 A1 | 5/2010 | Sakiyama et al. | |
| 2010/0222110 A1* | 9/2010 | Kim | G06F 1/1616 455/566 |
| 2010/0226733 A1* | 9/2010 | Ilda | B42B 5/08 412/1 |
| 2011/0055775 A1 | 3/2011 | Saito et al. | |
| 2011/0199639 A1 | 8/2011 | Tani et al. | |
| 2011/0279363 A1 | 11/2011 | Shoji et al. | |
| 2012/0105891 A1 | 5/2012 | Mano et al. | |

FOREIGN PATENT DOCUMENTS

| | | |
|---|---|---|
| CN | 101477435 A | 7/2009 |
| CN | 101742035 A | 6/2010 |
| CN | 102163124 A | 8/2011 |
| CN | 102253795 A | 11/2011 |
| EP | 2 068 545 A1 | 6/2009 |
| EP | 2 418 570 A1 | 2/2012 |
| JP | 4-118762 A | 4/1992 |
| JP | 7-14750 | 3/1995 |
| JP | 2003-195998 A | 7/2003 |
| JP | 2004-132740 A | 4/2004 |
| JP | 2004-282439 A | 10/2004 |
| JP | 2006-050144 A | 2/2006 |
| JP | 2007-58793 A | 3/2007 |
| JP | 2008-203439 A | 9/2008 |
| JP | 2009-78372 A | 4/2009 |
| JP | 2009-147924 A | 7/2009 |
| JP | 2009-175935 A | 8/2009 |
| JP | 2010-108070 A | 5/2010 |
| WO | 2010/113597 A1 | 7/2010 |

* cited by examiner

IMAGE DISPLAY CONTROL DEVICE AND IMAGE FORMING APPARATUS INCLUDING THE IMAGE DISPLAY CONTROL DEVICE

This Nonprovisional application claims priority under 35 U.S.C. § 119 (a) on Patent Application No. 2010-235676 filed in Japan on 20 Oct. 2010, the entire contents of which are hereby incorporated by reference.

BACKGROUND OF THE INVENTION (1) Field of the Invention

The present invention relates to an image forming apparatus such as a copier, printer, facsimile machine or the like, in particular, relating to an image forming apparatus having a function for allowing the user to check the status of images and edit images, by displaying images output based on the input image data in a preview representation.

(2) Description of the Prior Art

The recent copiers have been commoditized into products having various duplication processing functions as one way of presenting the advantages of digital copiers.

For instance, as a known example of a digital copier, there is an image forming apparatus that includes an input means having a function of receiving additional input of image data; and an output means for performing image output based on the image data input through the input means, and has a function of permitting the user to edit image data by displaying the images to be output from the output means in a preview representation. According to the image forming apparatus of this kind, it is possible to easily edit images to be output before execution of a job.

Under such circumstances, as the control panel in the image forming apparatus of this kind, a touch panel display has been often used in recent years. A touch panel display is formed of a liquid crystal panel (display panel) and a touch panel laminated on the liquid crystal panel.

Usually, on the touch panel display, a multiple number of items (software buttons) for selection of operational mode in the image forming apparatus are displayed. The user presses the position of the desired item among the items displayed on the touch panel display. The user feels as if the user presses the software button. The information on the position at which the user pressed is transferred from the touch panel to the computer that controls the image forming apparatus, whereby the operation to be made is determined in accordance with the pressed position, by the program running on the computer.

The touch panel display is able to provide both a display function and a control function. That is, the touch panel display has the advantage of a smaller area for installation, ability of giving various displays and providing various functions, compared to a configuration including a display and a controller separately.

Further, the recent touch panel displays have been realized with a function of recognizing the trace of movement of the fingers touching on the surface of the touch panel display. With this function, the user is able to command an appropriate operation that sensuously coincides with the movement. Controlling an electronic appliance by this kind of operation will be called "gesture control" in this specification. Examples of the gesture control are as follows.

When a preview of images captured by a scanning function is being displayed on the touch panel display, the following control operations are permitted.

(1) In the touch panel display, the position where the image as a target of control is tapped twice by the fingertip. This control is called "double tapping". When an image is double tapped, the display of the image may be enlarged or reduced, or the operation may be switched into the mode for editing the image.

(2) Two fingertips are spread apart on the image as a target of control (in the condition that the fingertips are put on the image). This control is called "pinch out" or "pinch open". When a pinching out or pinching open operation is made on the image, the image may be enlarged in accordance with the movement of the fingers.

(3) Two fingertips are brought together on the image as a target of control (in the condition that the fingertips are put on the image). This control is called "pinch in" or "pinch close". When a pinching in or pinching close operation is made on the image, the image may be reduced in size in accordance with the movement of the fingers.

Other than the above, examples of gesture control include "tap" an operation of hitting the position of the image as a target of control with the fingertip, "drag", an operation of sliding the image being displayed with the fingertip, "flick", an operation of sweeping the image being displayed lightly with the fingertip, and "pinch", an operation of pinching the image being displayed with two finger tips, and the like.

Here, tapping and double tapping are not the one that detects the trace of user's action on the touch panel display, so that they cannot be said to be a gesture in the strict sense of the word. However, all the above operations on the image inclusive of tapping and double tapping will be called gesture control.

In this specification, the operations on the touch panel display other than the gesture control described above will be called "touch control".

The touch control does not mean a direct operation on the image but indicates an operation for realizing a function as an alternative means of a hardware key. Typically, the touch control indicates an operation of detecting a user's request based on the displayed position of a software button (usually, a user interface part) displayed on the touch panel display and the operated position on the touch panel display by the user.

In a multi-functional machine having a touch panel display of this kind as a control panel, it is possible to designate the settings for various image finishing processes through the control panel. Examples of finishing processes include settings for various image processes such as margin sizes etc., stamping, stapling, hole-punching and the like.

However, in the conventional multi-functional machine, there occurred cases where a finishing process causes failure in the actual printing. For example, when printing is performed with hole-punching specified as a finishing process, the positions of the punch holes may overlap the output image, resulting in defective duplication. As a result, supplies (toner and recording paper) are wasted.

To deal with, a technology of an image forming apparatus in which preview display of images can be given on the basic screen in copy mode, has been proposed (see Patent Document 1).

According to this image forming apparatus, the screen of the control display is divided into three regions. In the regions on both sides of the control display, software buttons to designate the conditions for image forming and the finishing conditions are laid out. In the center, preview images of documents are laid out.

There are multiple kinds of display modes for displaying preview images in this image forming apparatus.

The first display mode shows a predetermined number of images (e.g., five images) arranged horizontally. In this case, the image arranged in the center of the control display is displayed greater in size than the other images.

The second display mode is a method of displaying two images on the odd-numbered page and even-numbered page, among the captured multiple document images, in a spread. When there are a large number of pages of images displayed on the control display, multiple two-page spreads are stacked one over another like a booklet.

The third display mode is a method of displaying multiple document images arranged matrix-wise. When the document images cannot be accommodated within the screen, all the document images can be checked by scrolling the screen.

As above, according to the technology described in Patent Document 1, efficient use of preview display enables the user to confirm the finished state of documents and reduce erroneous settings for finishing processes, mistake in copying operation and other failures.

PRIOR ART DOCUMENT

Patent Document 1:
Japanese Patent Application Laid-open No. 2008-203439
However, the technology disclosed in Patent Document 1 entails the problem as follows.

That is, in a case where multiple pages are given in a preview representation, if a specific page of the multiple pages is wanted to be moved to another position, it is necessary to display a series of pages including the pages in question in the preview region. However, in the technology disclosed in Patent Document 1, if a specific page is tried to be moved to another position when one page display or two-page spread display is given, the positional relationship of the specified page is unclear, causing failure in control, difficulty in control and other problems.

SUMMARY OF THE INVENTION

The present invention has been devised in view of the above conventional problems, it is therefore an object of the present invention to provide an image forming apparatus in which, when image edition is performed, the positional relationship of an image to be the editing target to other images can be made clear so as to ease the image editing operation.

The first aspect of the present invention resides in an image forming apparatus comprising:
an input unit receiving input of image data;
a storing unit storing the image data input through the input unit and,
an image display control device, characterized in that the image display control device, includes:
a display image generator generating a display image based on the image data stored in the storing unit;
a display portion having a preview region for displaying the display image generated by the display image generator; and,
a display controller for giving the display image generated by the display image generator, in a preview representation on the display portion, wherein
the image display control device includes multiple image display modes supporting editing functions of the image data, and
the display controller has an image display mode selecting function which, when the user selects a desired function, selects an image display mode that is most suitable for the user's desired function, from the multiple image display modes, in accordance with the user's control operation of selecting a function.

The second aspect of the present invention resides in that when the image display mode displayed on the display portion is for one page image display or two page image display (so-called two-page spread representation) at the time the user selects the desired function, the image display mode selecting function changes the image display mode to a mode that displays multiple page images greater than two pages, in a preview representation, in accordance with the user's control operation of selecting a function.

The third aspect of the present invention resides in that the user's control operation of selecting a desired function is an operation of selecting and moving an image displayed in the preview representation on the display portion.

The fourth aspect of the present invention resides in that the user's control operation of selecting a desired function is an operation of selecting an image to be edited and sliding the selected image leftwards or rightwards on the display portion.

The fifth aspect of the present invention resides in that the display portion further has a function selecting region displaying enabled functions for editing the image data, and, the user's control operation of selecting a desired function is an operation of selecting an editing function to be performed on the image to be edited, through the function selecting frame.

According to the first aspect of the present invention, when, for example, the user tries to perform an editing operation such as moving a page and the like, an image display mode in which that the number of preview images being automatically displayed becomes greater is selected and displayed, whereby it is possible to clarify the positional relationship of the target image to be edited relative to other images and ease user's image editing control. As a result, it is possible to reduce mistake in copying operation thus to provide an image forming apparatus that is improved in operativity.

According to the second aspect of the present invention, when an editing operation such as moving a page or the like is tried to be done in, for example, one page preview display mode (fit mode), the display screen is automatically switched from the one page preview display mode to multiple page display preview display mode (1D mode), whereby it is possible to easily perform the editing operation.

According to the third aspect of the present invention, it is possible to automatically actuate the screen display mode that is suitable for an image moving operation and display the corresponding frame without switching the display screen into the control frame.

According to the fourth aspect of the present invention, it is possible to automatically actuate the screen display mode that is suitable for an operation of moving the target image to be edited in the horizontal direction and display the corresponding frame without switching the display screen into the control frame.

According to the fifth aspect of the present invention, since the display screen can be positively switched in accordance with an editing function so as to give a display in the screen display mode that is suitable for the editing operation, the user can easily perform the editing operation.

DESCRIPTION OF THE PREFERRED EMBODIMENTS

The embodiment of the present invention will hereinafter be described with reference to the accompanying drawings.

Figure 1:
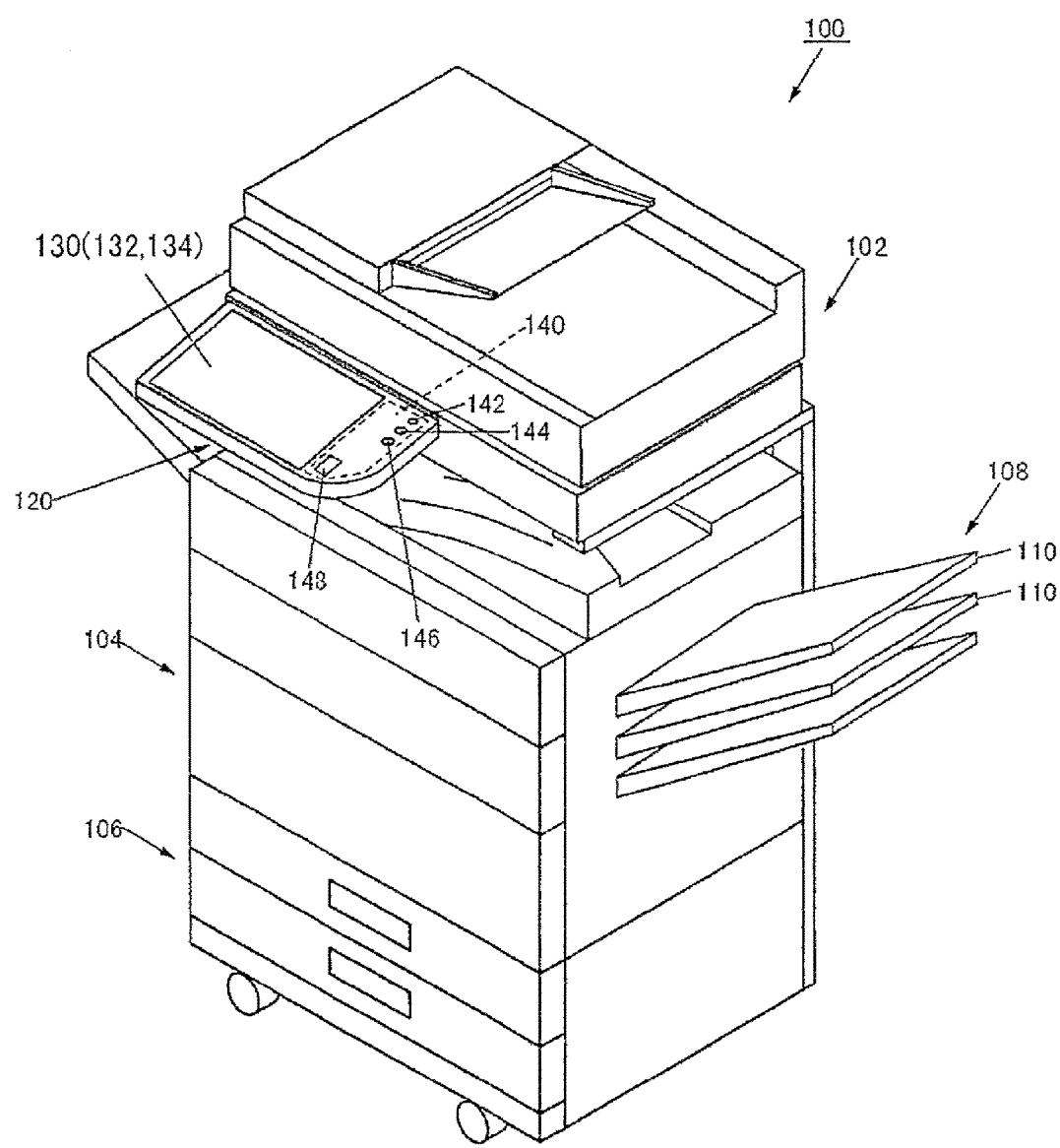
FIG. 1 is an illustrative view showing an overall configuration of an image forming apparatus according to the embodiment of the present invention.
Figure 2:
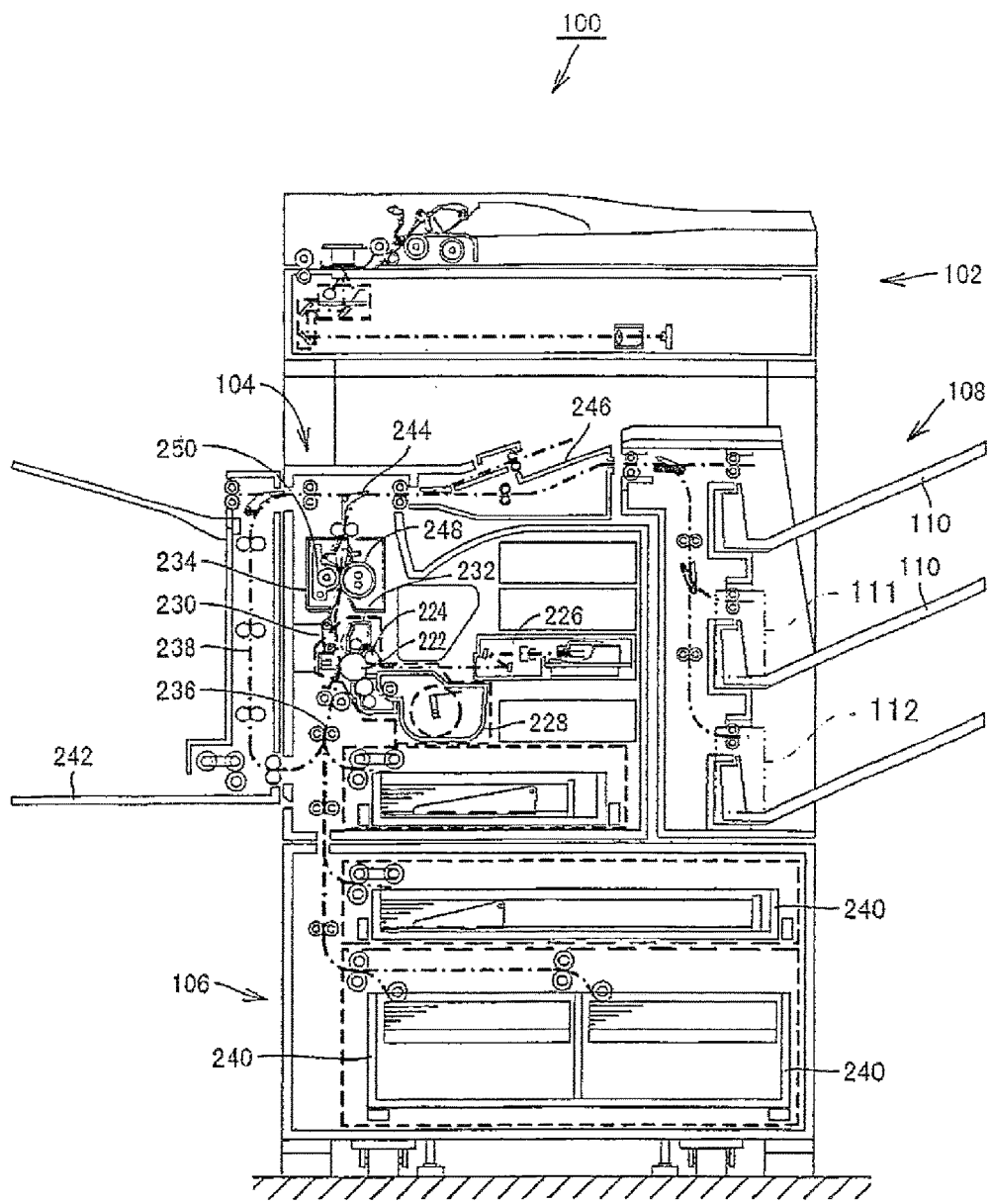
FIG. 2 is an illustrative view schematically showing the internal mechanisms of the image forming apparatus.
Figure 3:
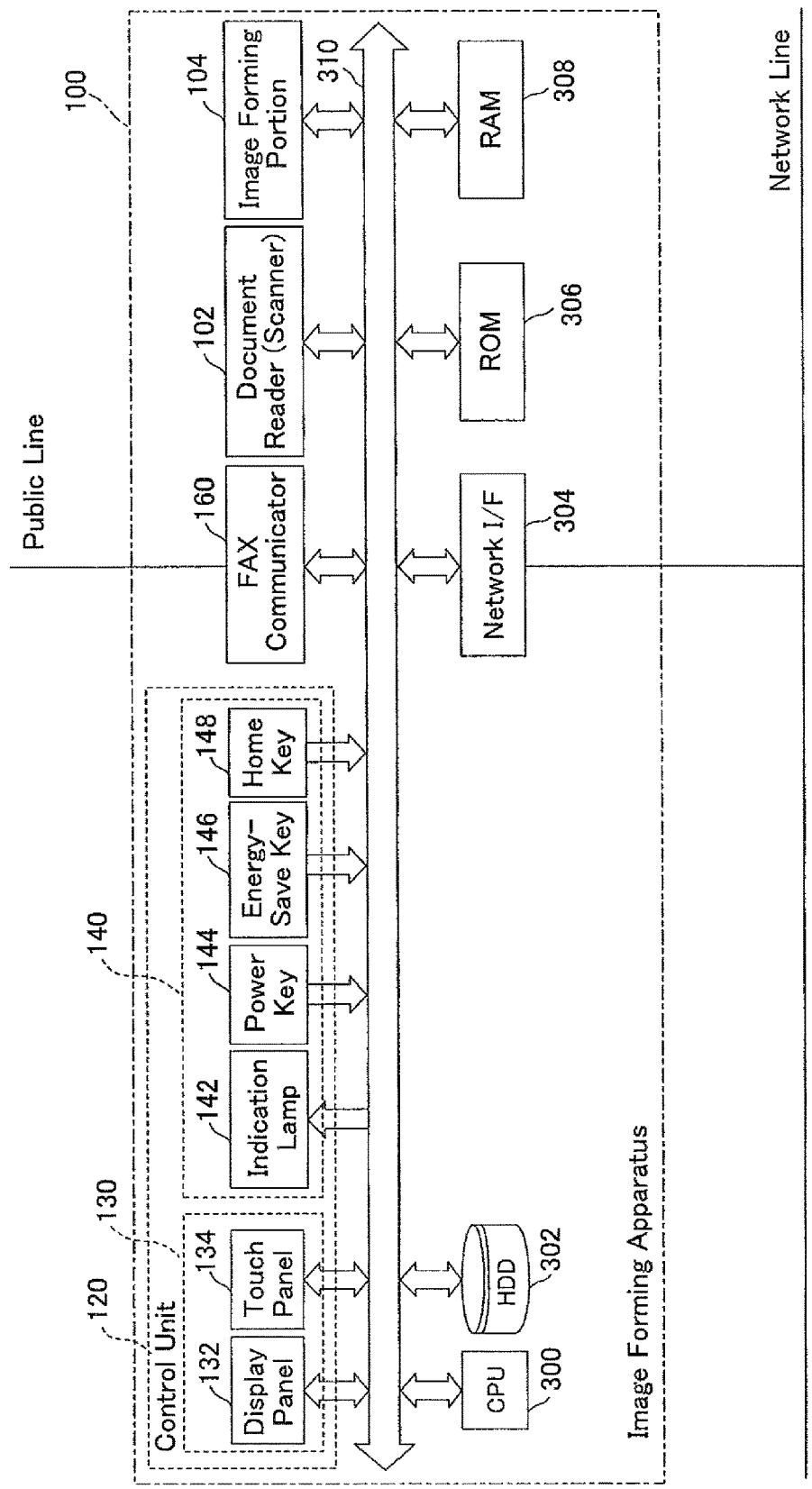
FIG. 3 is a functional block diagram showing a hardware configuration of the image forming apparatus.

FIG. 1 is an illustrative view of one example mode of carrying out the present invention, showing an overall configuration of an image forming apparatus according to the embodiment of the present invention. FIG. 2 is an illustrative view schematically showing the internal mechanisms of the image forming apparatus. FIG. 3 is a functional block diagram showing a hardware configuration of the image forming apparatus.

An image forming apparatus 100 according to the embodiment of the present invention, as shown in FIG. 1, includes: a document reader 102 having a function of receiving additional input of image data; an image forming portion 104 for forming an image on a recording medium based on the image data input through document reader 102; and a control unit (image display control device) 120 including a display panel (display portion) 132 for displaying preview images based on image data input and having a function of displaying display images on display panel 132 in a preview representation, based on the image data input from document reader 102.

Control unit 120 functioning as the image display control device has a function of setting up the image output conditions of images output from image forming portion 104 and is configured so that the image output conditions of images to be output can be designated on display panel 132.

The multiple document images displayed on display panel 132 are those that display the form of document images captured by the document reader etc., of image forming apparatus 100, in a preview representation and that display the output form of the images to be formed on the recording paper by the image forming portion, as preview images of the finish.

Image forming apparatus 100 is a kind of an image processing apparatus. The image display control device according to the present invention is also applicable to image processing apparatus and electronic appliances other than the image forming apparatus of this kind.

Further, image forming apparatus 100 includes a plurality of operational modes, and is preferably equipped with a display device for displaying information so that the user can easily get the information the user wants even if the user does not remember the screen configuration when the operational mode is changed over and the display content on the display device is replaced.

Here, image forming apparatus 100 includes a touch panel display (control screen) that can be controlled by both gesture control and touch control other than gesture control, but the image forming apparatus may an apparatus that includes a touch panel display controllable by touch control only. Further, the image forming apparatus may be an apparatus that includes a display panel that cannot be controlled but can display only and keys for control This image forming apparatus 100 forms images on recording paper based on electrophotography.

Image forming apparatus 100 includes, as its operation modes, copy mode, facsimile mode (FAX mode), document filing mode (a mode in which scanned images are stored in a storage inside the image forming apparatus) and mail mode (a mode in which scanned images are transmitted in the form of an attachment file to an e-mail). This image forming apparatus 100 may further have a network printer mode.

The image forming apparatus of the present invention is not limited to this as long as it can change the screen content in every operational mode.

To begin with, image forming apparatus 100 will be described.

Image forming apparatus 100 includes document reader 102, image forming portion 104, a paper feed portion 106, a paper output processor 108 and a control unit 120, as shown in FIG. 1.

Control unit 120 is formed of a touch panel display 130 and a display control portion 140. Touch panel display 130 is comprised of a display panel 132 of a liquid crystal panel or the like and a touch panel (touch control detecting means) 134 that is laid over display panel 132 to detect the positions the user presses with fingers. Display control portion 140 includes an indication lamp 142, a power key 144, an energy-save key 146 and a home key 148 that resets the display content of touch panel display 130 to the home screen for operational mode selection.

In this way, image forming apparatus 100 has touch panel display 130 as a main control device and also has a display control portion 140 that includes the hardware keys and indication lamps. The keys (power key 144, energy-save key 146 and home key 148) on display control portion 140 are given as hardware buttons, in contrast to software buttons formed by touch panel display 130.

Note that image forming apparatus 100 should not be limited to that including display control portion 140 of this kind, but may be provided with touch panel display 130 only. That is, it will work as long as the initial screen of the selected operational mode can be actuated when the user selects an operational mode on the home screen displayed on touch panel display 130. Next, the operational modes of this image forming apparatus 100 will be described.

(Copy Mode)

The operation of the copy mode of image forming apparatus 100 will be described.

In this copy mode, image reader (which will be referred to hereinbelow as "scanner") 102 and image forming portion 104 operate mainly.

In image forming apparatus 100, a document placed on a document placement table is read as image data by scanner 102 and the read image data is input to a CPU 300 of a microcomputer etc. shown in FIG. 3, where the image data undergoes various kinds of image processing, and the processed image data is output to image forming portion 104.

As shown in FIG. 2, image forming portion 104 is a mechanism that prints images of documents given as image data onto recording mediums (recording paper in most cases), including a photoreceptor drum 222, a charging device 224, a laser scan unit (which will be referred to hereinbelow as "LSU") 226, a developing device 228, a transfer device 230, a cleaning unit 232, a fixing unit 234, an unillustrated charge eraser and other devices.

Also, image forming portion 104 is provided with a main feed path 236 and a reverse feed path 238. The recording paper fed from paper feed portion 106 is conveyed along main feed path 236. Paper feed portion 106 draws recording paper, one sheet at a time, from a stack of recording paper, held in a paper feed cassette 240 or set on a manual feed tray 242 and delivers the recoding paper to main feed path 236 of image forming portion 104.

In the course of the recording paper being conveyed along main feed path 236 of image forming portion 104, the recording paper passes through and between photoreceptor drum 222 and transfer device 230 and then passes through fixing device 234 to perform printing for the recording paper.

While photoreceptor drum 222 rotates in one direction, its surface is cleaned by cleaning device 232 and the charge erasing device, then uniformly electrified by charging device 224.

LSU 226 modulates the laser beam based on the image data to be printed and repeatedly scans the laser beam over the photoreceptor drum 222 surface in the main scan direction, to form an electrostatic latent image on the photoreceptor drum 222 surface.

Developing unit 228 supplies toner to the photoreceptor drum 222 surface and develops the electrostatic latent image to form a toner image on the photoreceptor drum 222 surface.

Transfer device 230 transfers the toner image on the photoreceptor drum 222 surface to the recording paper which passes through the nip between the transfer device 230 and photoreceptor drum 222.

Fixing device 234 includes a heat roller 248 for heating recording paper and a pressing roller 250 for pressing recording paper. The recording paper is heated by heat roller 248 and pressed by pressing roller 250 so that the toner image transferred to the recording paper is fixed to the recording paper. A heater in the heat roller is heated by the power supplied to this fixing unit 234 so as to control and keep heat roller 248 at a temperature suitable for fixing. When the apparatus enters the energy saving mode, for instance the power supplied to this heater is stopped or cut down.

Arranged at the junction between main feed path 236 and reverse feed path 238 is a branch claw 244. When printing is performed on one side of recording paper only, branch claw 244 is positioned so as to lead the recording paper from fixing device 234 toward a paper output tray 246 or paper output processor 108.

When printing is performed on both sides of recording paper, branch claw 244 is rotated in the predetermined direction so that the recording paper is once conveyed toward the paper output tray 246 side. Then, the paper is switched back and conveyed toward reverse feed path 238. The recording paper then passes through reverse feed path 238 and is inverted upside down and fed to main feed path 236 again. The recording paper is once again printed on its rear side in the course of main feed path 236 and lead to paper output tray 246 or paper output processor 108.

The recording paper thus printed is lead to paper output tray 246 or paper output processor 108 and discharged to either paper output tray 246 or each of paper output trays 110 of paper output processor 108.

In paper output processor 108, a plurality of recording sheets are sorted and discharged to individual paper output trays 110, and/or each set of recording sheets is punched or stapled. For example, when multiple copies of printed documents are prepared, the printed recording sheets are sorted and discharged to paper output trays 110 so that one copy of the printed documents is allotted to individual paper output tray 110, and the printed documents on each paper output tray 110 are punched by a punching unit 111 or stapled by a stapling unit 112 to prepare individual printed material.

(Facsimile Mode)

Next, the operation in facsimile mode will be described.

In this facsimile mode, the transmitting operation is mainly effected by document reader (scanner) 102 and a FAX communicator 160, as shown in FIG. 3. The receiving operation is mainly effected by FAX communicator 160 and image forming portion 104.

(Transmitting Operation)

The transmitting operation is performed by the steps of: selecting the facsimile mode, reading image data from a document placed on the document placement table by means of document reader 102, supplying the read image data to CPU 300 made up of a microcomputer etc. shown in FIG. 3 where the image data is subjected to various kinds of image processes, and outputting the thus obtained image data to the FAX communicator (FAX communicator 160 in FIG. 3).

As shown in FIG. 3, FAX communicator 160 of the transmission side image forming apparatus 100 connects the selected transmitter side line to the designated destination, converts the image data into communication data conforming to the facsimile communication standard and transmits the communication data to the receiver side facsimile machine (e.g., image forming apparatus 100 having a facsimile function).

(Communication Operation)

When connection of the line is established, FAX communicator 160 of image forming apparatus 100 on the receiver side detects a communication request signal from FAX communicator 160 of image forming apparatus 100 on the transmitter side and sends a response signal. Then, for example, FAX communicators 160 on both the transmitter and receiver sides exchange facsimile performance information of their own with each other and determine the communication rate and coding and code correction scheme of the image data within the available maximum capacity to set up a modem communication scheme. The data is transmitted using an image signal system in conformity with this communication scheme, from FAX communicator 160 of image forming apparatus 100 on the transmitter side to FAX communicator 160 of image forming apparatus 100 on the receiver side. When data transmission is ended, the line is cut off.

(Receiving Operation)

The FAX communicator 160 of image forming apparatus 100 on the receiver side converts the received data into image data and sends the data to image forming portion 104. Here, the received data may be converted into image data by image forming portion 104. Image forming portion 104 prints images of documents represented by the image data converted from the received data, onto recording paper, in the same manner as the above-described operation in copy mode.

Next, the control block configuration of image forming apparatus 100 will be described with reference to the drawings.

As shown in FIG. 3, image forming apparatus 100 includes: control unit 120 that allows the user to set copy mode and facsimile mode; a ROM 306 for storing programs etc.; a hard disk 302 serving as a non-volatile storage area that can hold programs, data and the like even if the power is cut off; and a RAM (Random Access Memory) 308 that offers a storing area when a program is executed.

Image forming apparatus 100 further includes: a bus 310 connected to image reader 102, image forming portion 104, FAX communicator 160, control unit 120, ROM 306, hard disk 302 and RAM 308; and CPU 300 that is connected to bus 310 to realize general functions as an image forming apparatus.

Hard disk 302 records (stores) files of image data of documents scanned by the image forming apparatus 100. Hard disk 302 also stores initial screen data for each operational mode. The files and data stored in hard disk 302 can also be recorded in ROM 306.

Stored in ROM 306 are programs, data and the like necessary for controlling the operation of image forming apparatus 100. As the data stored in ROM 306 with the programs, the initial screen data for each operational mode may be stored. CPU 300 controls image forming apparatus 100 in accordance with the programs and data stored in ROM 306 and performs control associated with each function of image forming apparatus 100.

As shown in FIG. 3, a public line for exchange of image data is connected to FAX communicator 160 of this image forming apparatus 100 while a network line is connected to a network interface 304. This network line may be connected to a computers etc. that use this image forming portion 100 as a network printer or may be connected via the internet to a computer etc. that is identified by a designated URL (Uniform Resource Locator). When connected to the Internet in this way, the image forming apparatus 100 can obtain the necessary information via the Internet.

RAM 308 offers a function as a working memory for temporarily recording the result of the operation and processing by CPU 300 and a function as a frame memory for recording image data.

Control of image reader 102, image forming portion 104, touch panel display 130 and display control portion 140 forming control unit 120, ROM 306, hard disk 302 and RAM 308 is performed by CPU 300 executing predetermined programs. Here, control unit 120 communicates with CPU 300 byway of an input/output interface.

Control unit 120 is given as a board-like panel that is tilted so as to allow the user ease of view. Control unit 120 includes touch panel display 130 in the left area and display control portion 140 (including indication lamp 142 and hardware buttons, namely, power key 144, energy-save key 146 and home key 148) in the right area on the top thereof. Touch panel display 130 and display control portion 140 are integrally provided in control unit 120.

As described above, this touch panel display 130 is formed of display panel 132 and touch panel 134 that is laid over display panel 132.

Displayed on display panel 132 in touch panel display 130 are the home screen for selection of the operational mode in this image forming apparatus 100, the current status of this image forming apparatus 100, the status of destination selection, job processing status and the like. Displayed in the preview display region of display panel 132 are selection buttons as software keys. When the displayed area of a selection button is pushed by a finger, touch panel 134 detects the pushed position. Then, the position on which touch panel 134 is pressed is compared with the positions of selection buttons so as to perform selection of an operational mode of image forming apparatus 100, functional setting, operational instructions, and the like. In addition to this touch control (command input control based on the position of the user's pressing), this image forming apparatus 100 also supports the above-mentioned gesture control (command input control based on the trace of a user's control operation).

Further, indication lamp 142 of display control portion 140 is made up of a LED (Light Emitting Diode) for instance and is controlled by CPU 300 so as to turn on/off (/flash on and off). When the user presses down power key 144 that is provided separately in addition to the main power switch, this image forming apparatus 100 comes out of standby mode (in which, for example, only fax reception is permitted with the main power turned on) to active mode so that the whole operational modes of this image forming apparatus 100 can be used. Indication lamp 142 comes on in link with this status. Further, when a predetermined period has elapsed without receiving any user input, or when the user presses energy-save key 146, this image forming apparatus 100 comes out of active mode into energy save mode so that only part of the operational modes of image forming apparatus 100 are operational. Indication lamp 142 flashes on and off in link with this status. Further, when the user presses energy-save key 146 in this energy save mode, the image forming apparatus 100 comes out of energy save mode into active mode. Home key 148 is a hardware key for retuning the display of touch panel display 130 into the initial condition (home screen). It is noted that the operations when power key 144, energy-save key 146 and home key 148 are pressed should not be limited to these.

The hardware keys on display control portion 140 (power key 144, energy-save key 146 and home key 148) may be embedded with a key lamp controlled by CPU 300 so as to turn on/off (/flash). For example, this key lamp may be a round type key ring-like lighting or center lighting. This key lamp turns on at the timing that the hardware key is permitted to use as a control device (at the timing that operation is performed when the hardware key is used).

Image forming apparatus 100 has the aforementioned two operational modes (copy mode and facsimile mode). Software buttons for function settings in each operational mode are displayed on touch panel display 130, and also the preview as the on-screen form of forming images, keys for destination setting and the like are displayed as necessary.

When the operational mode is different from that which the user wants, touch panel display 130 displays another screen. Even in such a case, in order for the user to easily find the information the user requests, touch panel display 130 is divided into multiple regions (which also are given in a size variable manner) so as to display necessary information in each region.

In particular, in this image forming apparatus 100, when one operational mode is selected on the home screen of touch panel display 130 provided as the main display control device, the initial screen of the operational mode is displayed.

In this initial screen, (1) the basic layout is formed of five areas, namely "system region", "function selecting region", "preview region", "action panel region" and "task trigger region", which are appropriately separated and arranged, so that the user is able to easily perform input of settings from top left to bottom right (because the user can move their gaze and fingertip in the same manner as in the conventional machine which is not provided with a large scale touch panel display 130). Further, (2) the concept of the displays of the five regions is consistent in any of different operational modes, so that the user is able to operate without confusion when another operational mode is used. (3) The size of the "function selecting region" is changed depending on the display mode. In link with this, the size of the "preview region" is also changed. The function setup information and preview information can be exactly notified to the user. (4) The "preview region" is laid out in the center while the "function selecting region and "action panel region" as well as "task trigger region" are arranged on the opposite sides from each other. As a result, it is possible to select a function in the region ("function selecting region") arranged on one side, check the processing status of the selected function in a preview representation in the region arranged in the center, and request the execution of the process through the region arranged on the other side ("action panel region" and "task trigger region"). That is, this arrangement enables the user to move eyes and the hand linearly, hence control smoothly.

Now, the home screen in touch panel display 130 will be described with reference to the drawings.

Figure 4:
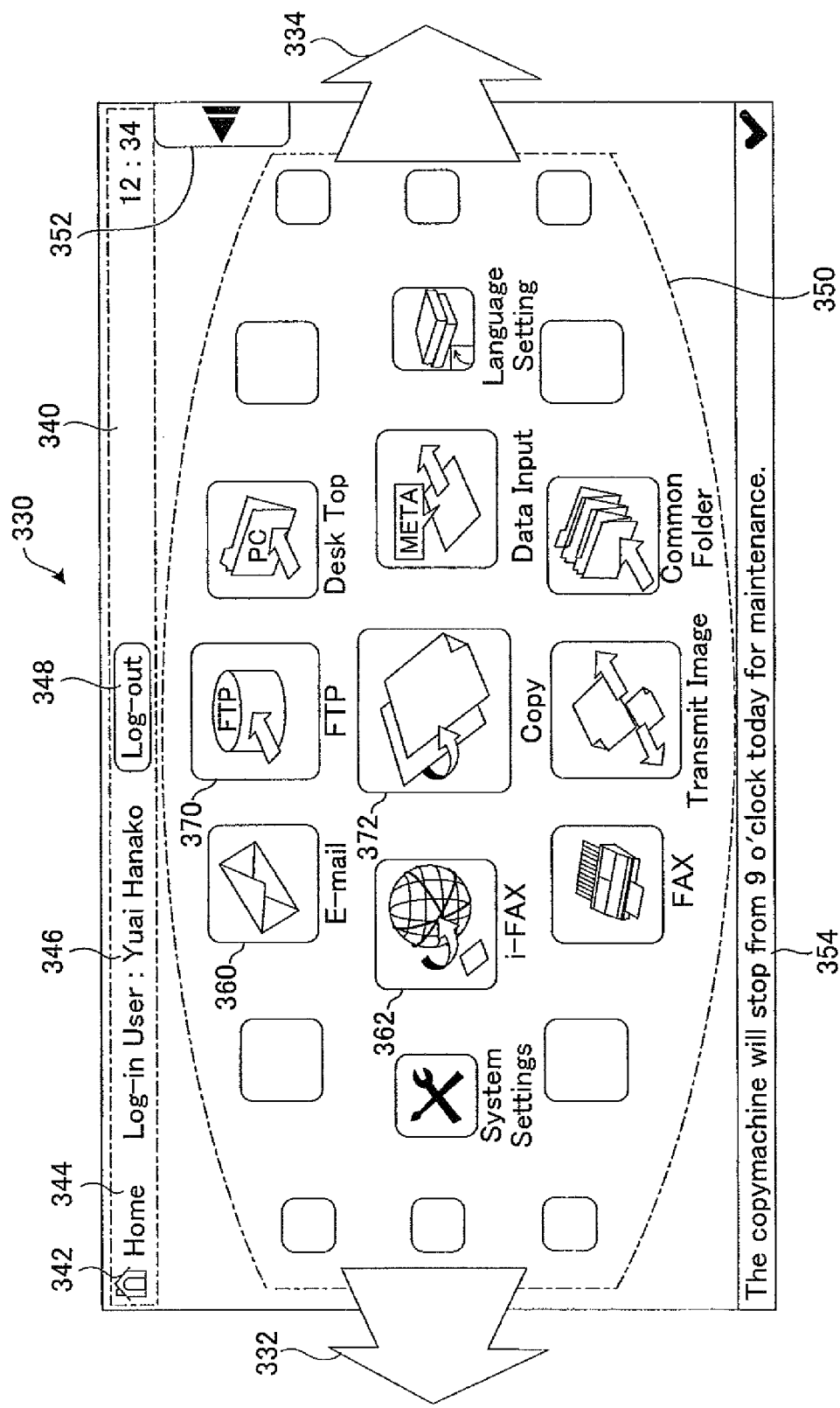
FIG. 4 is an illustrative view showing a home screen displayed on a touch panel of the image forming apparatus of the embodiment.

FIG. 4 is an illustrative view showing the home screen displayed on the touch panel of the image forming apparatus of the present embodiment.

As shown in FIG. 4, a home screen 330 of image forming apparatus 100 includes a home system region 340 corresponding to the aforementioned system region, an icon display region 350, an icon display switching tab button 352 and a comment display region 354.

In home system region 340, an area 342 for displaying an icon showing the home screen, area 344 for displaying the title of the screen being displayed, area 346 for displaying the log-in username and area 348 for displaying a log-out button (software button) are laid out. Arranged at the right end of home system region 340 is an area displaying the current time.

Icon display region 350 displays an icon representing an operational mode with the title of the operational mode or its abbreviation. In the present embodiment, an icon 372 for selecting copy mode, icon 362 for selecting facsimile mode, icon 370 for selecting document filing mode, icon 360 for selecting e-mail mode and the like are displayed in icon display region 350. Icons for selecting other than these processing are also displayed in icon display region 350. Examples of these icons include an icon for actuating system setup, icon for actuating language setup, icon for displaying job status and the like.

In the present embodiment, icons are arranged in a matrix with 3 rows and 7 columns in icon display region 350. The icons arranged in the center of icon display region 350 are displayed to be greater than the icons arrange in the periphery.

As the user flicks display region 350 leftwards, the icons (icon array) displayed on the screen move as if they flow in the direction of an arrow 332. As the user flicks display region 350 rightwards, the icons displayed on the screen move as if they flow in the direction of an arrow 334.

In the present embodiment, the amount of movement of the icon on the screen by a flicking operation is determined by the distance of movement of the fingertip and its speed at the flicking operation. If the moving speed of the fingertip is equal, the greater the distance of movement the greater the amount of movement of the icon. If the distance of movement of the finger tip is equal, the greater the speed of movement the greater the amount of movement of the icon. The preferable initial speed of movement on the screen is approximately equal to the moving speed of the fingertip.

It is assumed that the icons in this icon display region 350 move as if they were arranged on the peripheral side of a virtual cylinder. That is, as the screen is repeatedly moved rightwards, the same screen repeatedly appears in the same manner as the cylinder is turned.

Comment display region 354 displays maintenance information and the like, which should be notified to all the users of this image forming apparatus 100.

Next, the basic layout configuration of the display screen in touch panel display 130 (FIG. 1) of image forming apparatus 100 will be described taking an example of the basic layout at the time of copy mode operation.

Figure 5:
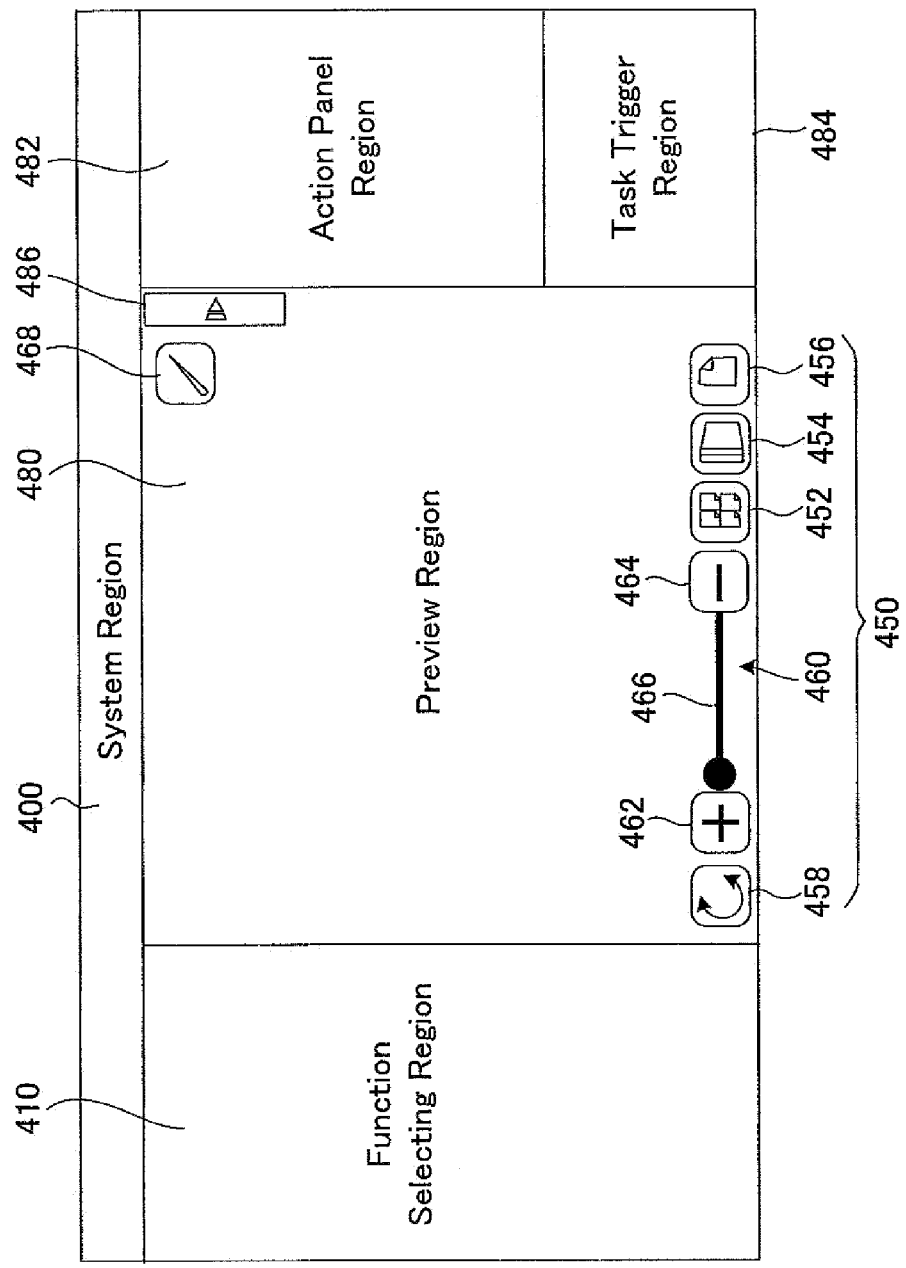
FIG. 5 is an illustrative diagram showing a state of partitioned display regions on the display screen in a touch panel display of the image forming apparatus.

FIG. 5 is an illustrative diagram showing a state of partitioned display regions on the display screen in a touch panel display of the image forming apparatus of the present embodiment.

(Layout of Copy Basic Screen)

The basic screen in copy mode (which will be referred to hereinbelow as "copy basic screen") in touch panel display 130 of image forming apparatus 100 is the frame as shown in FIG. 5, which is initially displayed when copy mode is selected.

One of the characteristics of the present embodiment is that preview can be basically seen in all kinds of screens including the copy basic screen. A similar image preview can be selected in the mode of facsimile transmission, image transmission by e-mail, image filing or the like. In any of these operational modes, the basic screen configuration as to preview representation is equivalent. Accordingly, the following description will be given on the copy basic screen only.

To begin with, the basic layout of touch panel display 130 of image forming apparatus 100 will be described with reference to the drawings.

As shown in FIG. 5, the basic layout of touch panel display 130 is configured in the laterally long touch panel display 130 (for example, 1024 pixels wide×600 pixels high) such that a system region 400 is arranged at the topmost part, a preview region (preview display region) 480 in the center of the screen, a function settings/confirmation region 410 (which will be written hereinbelow as function selecting region 410) on the left side of preview region 480, an action panel region 482 on the upper right part of preview region 480, and a task trigger region (control key displayed region) 484 on the lower right of preview region 480.

It is noted that the number of regions in touch panel display 130 should not be limited to five. Also, the horizontal arrangement should not be limited to this so that the horizontal arrangement may be reversed right side left, for example, depending on the user's dominant hand. Further, the position of system region 400 may be disposed at the lowermost part. Alternatively, the system region may be undisplayed depending on the status or settings.

System region 400 displays the current status of this image forming apparatus 100, e.g., the title of the operational mode in control and the status and conditions of image forming apparatus 100. For example, displayed in system region 400 are the name of operational mode, the cut-in key, the log-in user name, the job status in progress, the usage status of built-in memory, time and the like.

In function selecting region 410, settings in each function, display switching, function selecting menu (icons, buttons, etc.) operated by user to confirm settings are variably displayed in a selected display style, i.e., in icon mode, regular mode or express mode. In icon mode, only icons for function setting are displayed in function selecting region 410 so as to maximize the size of preview region 480.

In express mode, the display of function selecting region 410 is enlarged so as to allow the user to set the function all at once though the size of preview region 480 is minimized.

In regular mode, preview region 480 is sized between that in the icon mode and that in the express mode while in function selecting region 410 the text of function titles are displayed together with functional setting icons.

Preview region 480 displays the image of the output pages of the (finished) document. The image is displayed using dummy data or scanned data, and the displayed image in preview region 480 is revised every time the user changes the finish. There are two modes of displaying the finish in this preview region 480: the display of the final preview with a dummy image in virtual mode before scanning and the display of the final preview with actual images in scan-in mode after scanning. The virtual mode further has two types, before setting documents and after setting documents.

At the bottom of preview region 480 there is a group of preview select buttons 450 for changing the display style of preview region 480. The group of preview select buttons 450 includes a rotate button 458 for rotating the preview by a predetermined angle, a zoom bar 460 for enlarging and reducing the preview images, a document display mode button 452 for directing change to the aftermentioned document display mode, a finish preview button 454 for directing change to s finish preview frame and a fit-to-screen button 457 for directing change to fit-to-screen mode (which will be referred to hereinbelow as "fit mode").

As rotate button 458 is touched, a dialog for designating the rotating angle of the preview is displayed. As a desired angle is designated, the preview image displayed in the preview region is rotated by that angle. It is also possible to rotate the preview by making a gesture control on the preview image. For example, as the two fingers are put on the preview image and then the fingertips are rotated, the preview image rotates in the direction of rotation of the fingers by the angle that is determined by amount of movement of the fingers.

When the (+) button 462 of zoom bar 460 is touched, or when bar 466 is gesture-controlled (by the "drag or slide") toward the (+) button 462, the preview is enlarged. Alternatively, when the image of the finished document image displayed in the preview region is gesture-controlled (on the document image by the "pinch out/pinch open" with fingertips), the preview is also enlarged.

When the (−) button 464 of zoom bar 460 is touched, or when bar 466 is gesture-controlled (by "drag or slide") toward the (−) button 464, the preview is reduced in size. Alternatively, when the image of the finished document image displayed in the preview region is gesture-controlled (on the document image by the "pinch in/pinch close" gesture with fingertips), the preview is also reduced in size.

When there are many pages of document images to be displayed in preview region 480, touchable displayed page select buttons (page number input buttons, page up and down buttons, single page display button and multiple page display button, etc.) may be displayed. In this case, it is also possible to turn over or return the page of the document to be previewed by a touching and sliding (flicking operation) of the document image. Further, when the document image to be displayed in preview region 480 is large, scroll bars that can be touched or gesture-controlled may be displayed.

Action panel region 482 displays information such as hint, advice and suggestion for operation and control. Display in this action panel region 482 is given such that when a particular function is selected by a certain user, the functions associated with the subject function may be displayed, another function as to the subject function may be displayed in a purpose-oriented manner, or the function that was selected in the past in combination with the subject function by the same user or a user of the group to which this user belongs may be displayed as a "recommended function".

Displayed on the left side of action panel region 482 is an action panel folding button 486, which is operated by the user when action panel region 482 should be displayed in a contracted representation.

As action panel folding button 486 is pressed, action panel region 482 is contracted and a button is displayed at the right edge of the screen, as described later. As action panel folding button 486 is pressed once again, the action panel region 482 which has been displayed in a contracted representation is displayed in enlargement. That is, action panel region 482 can be reduced or enlarged by user pressing the button. Along with this operation, preview region 480 is enlarged or reduced. By this screen control, the user can easily confirm preview images and check operation hint, based on the user's intention.

Task trigger region 484 displays triggering items (software buttons) for starting a particular operation of image forming apparatus 100. The display of the item is given when all the settings in the selected operational mode have been completed so that image forming apparatus 100 is enabled to actually start the operation. For example, in task trigger region 484, the scan start button ("SCAN IN" button, in FIG. 6 and afterwards), monochrome copy start button (MONO START), color copy start button (COLOR START), or clear all button (CA) is displayed.

The scan start button is the button that triggers reading of documents once and performs a preview process in copy and FAX transmission modes.

The monochrome copy start button is the button that triggers reading of documents and directly performs image forming of monochrome images on recording paper.

The color copy start button is the button that directly starts image forming of color images of document. The clear-all button is a button to clear all the input information.

The layout of these five regions is not changed even if the operational mode is switched from one to another (in the initial screen of any operational mode). Further, each region may change in size, expanding or contracting in the horizontal (longitudinal) direction of the screen of touch panel display 130 as in the case where the display of function selecting region 410 (and preview region 480) is switched between icon mode, regular mode and express mode.

The layout of the five regions is designed in light of the user interfaces in conventional machines, by directing attention to user's path of gaze and control. This arrangement leads the user to perform settings by moving their gaze from top left to bottom right and moving their input action (fingers of the dominant hand) from top left to bottom right on touch panel display 130.

In this arrangement, for switching the operational mode from one to another in normal control, the user presses down home key 148 (FIGS. 1 and 2) and selects another operational mode on the home screen. In this way, it is possible to change operational mode by way of the home screen.

(Display Layout in Each Image Display Mode)

Next, image display mode corresponding to each operational mode in image forming apparatus 100 will be described with reference to the drawings.

Figure 6:
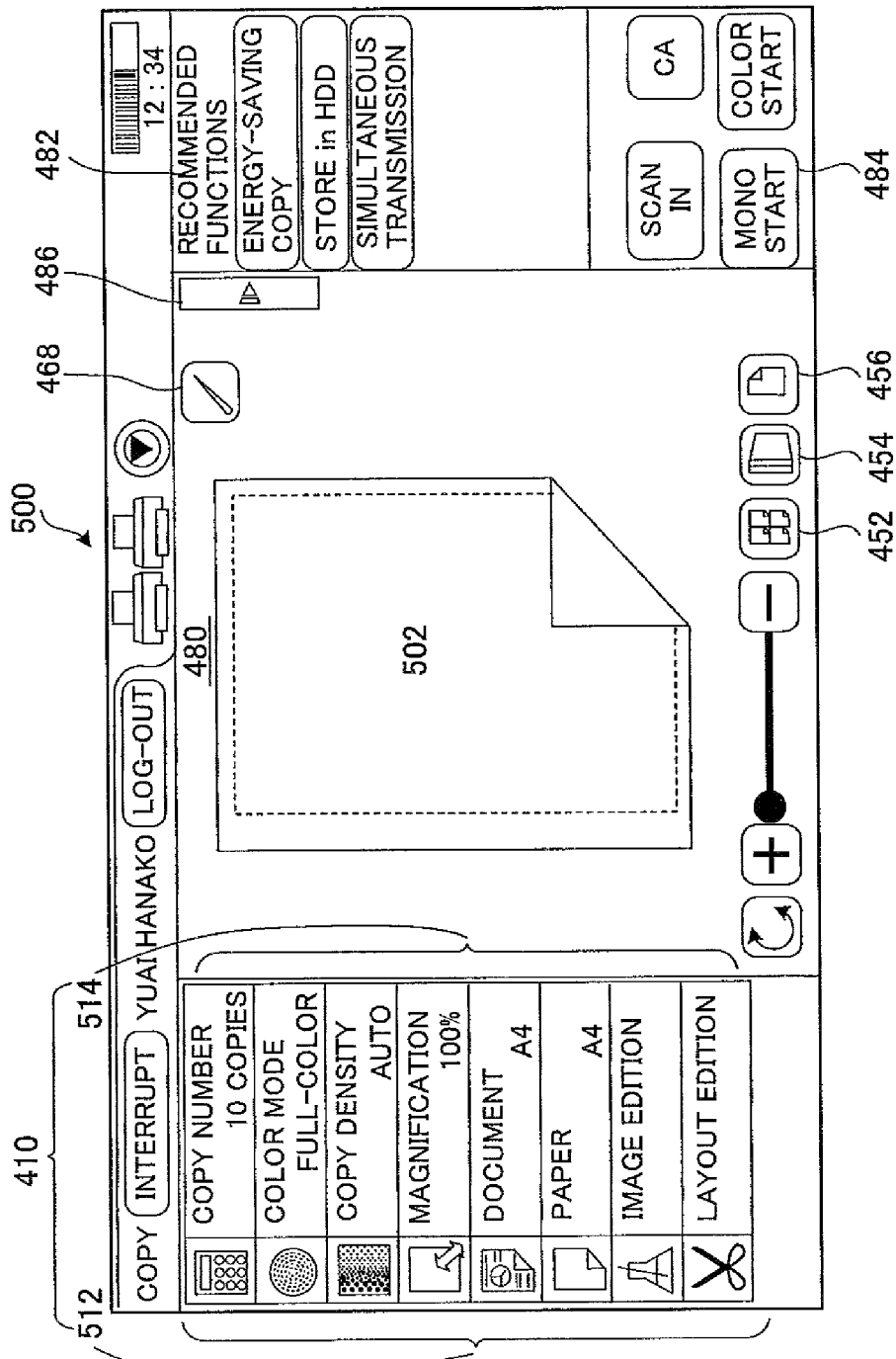
FIG. 6 is an illustrative diagram showing a state of partitioned display regions in fit mode in a preview representation of the image forming apparatus.
Figure 7:
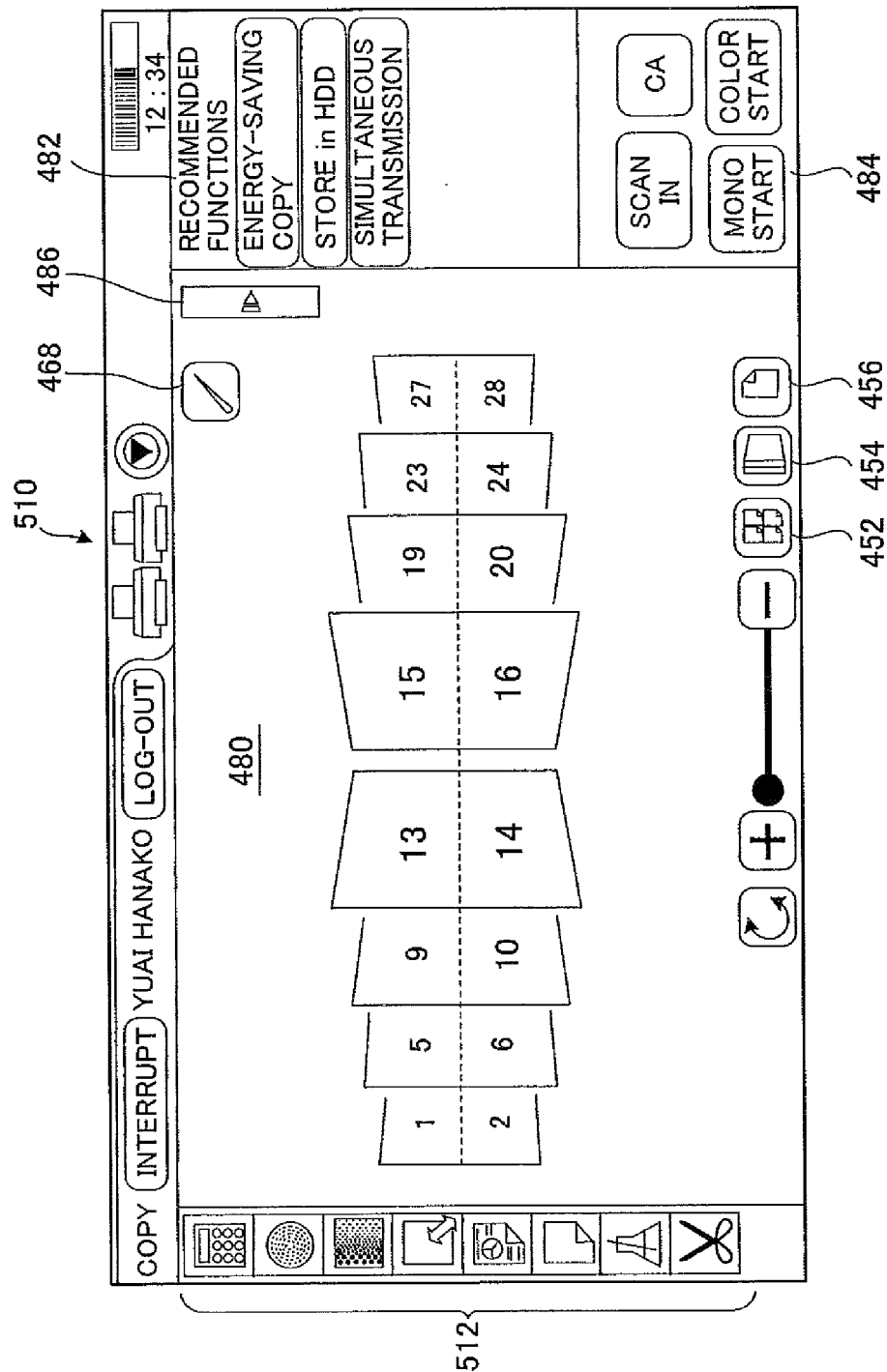
FIG. 7 is an illustrative diagram showing a state of partitioned display regions in finish preview mode in a preview representation of the image forming apparatus.
Figure 8:
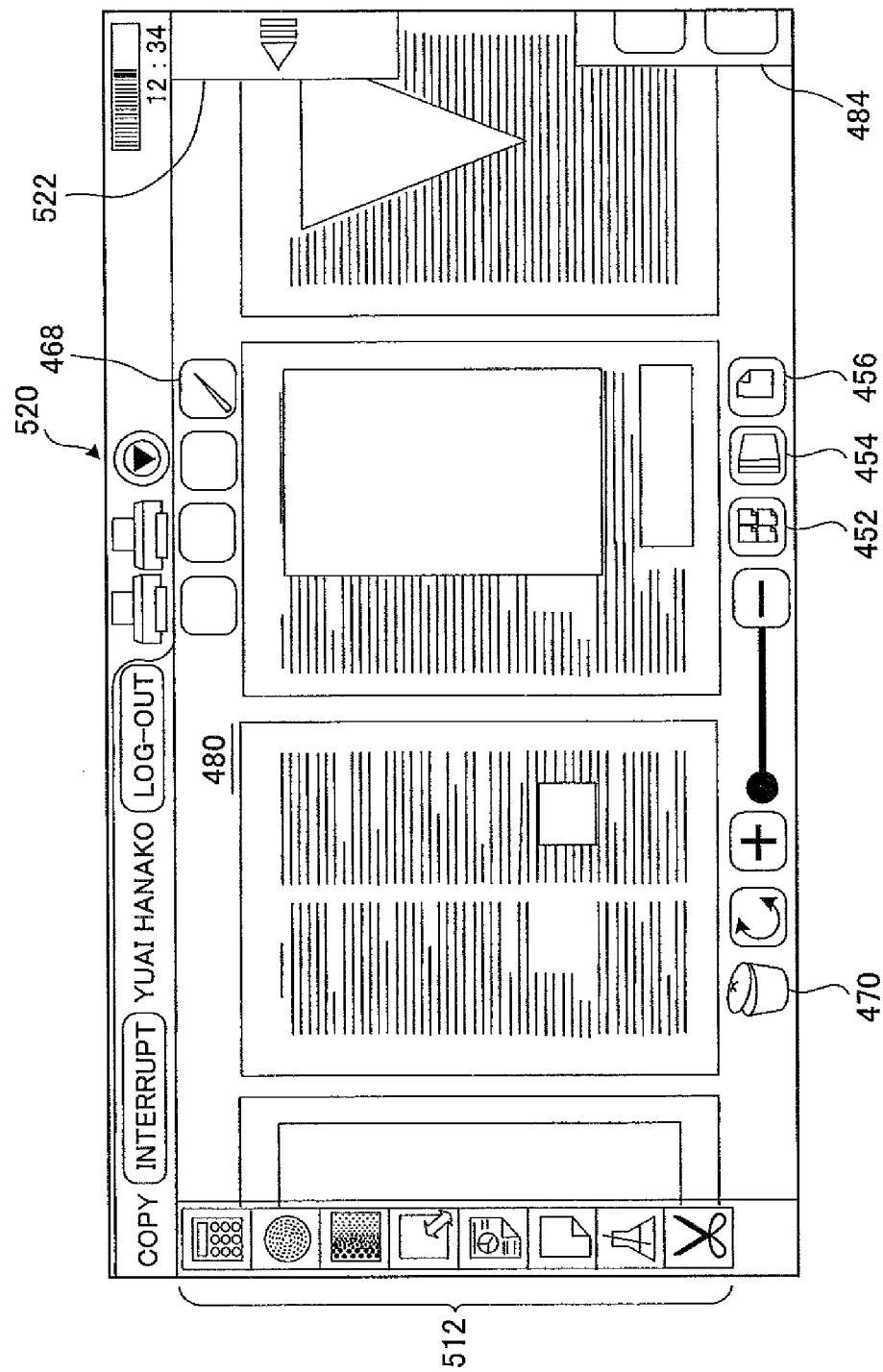
FIG. 8 is an illustrative diagram showing a state of partitioned display regions in image edition mode in a preview representation of the image forming apparatus.
Figure 9:
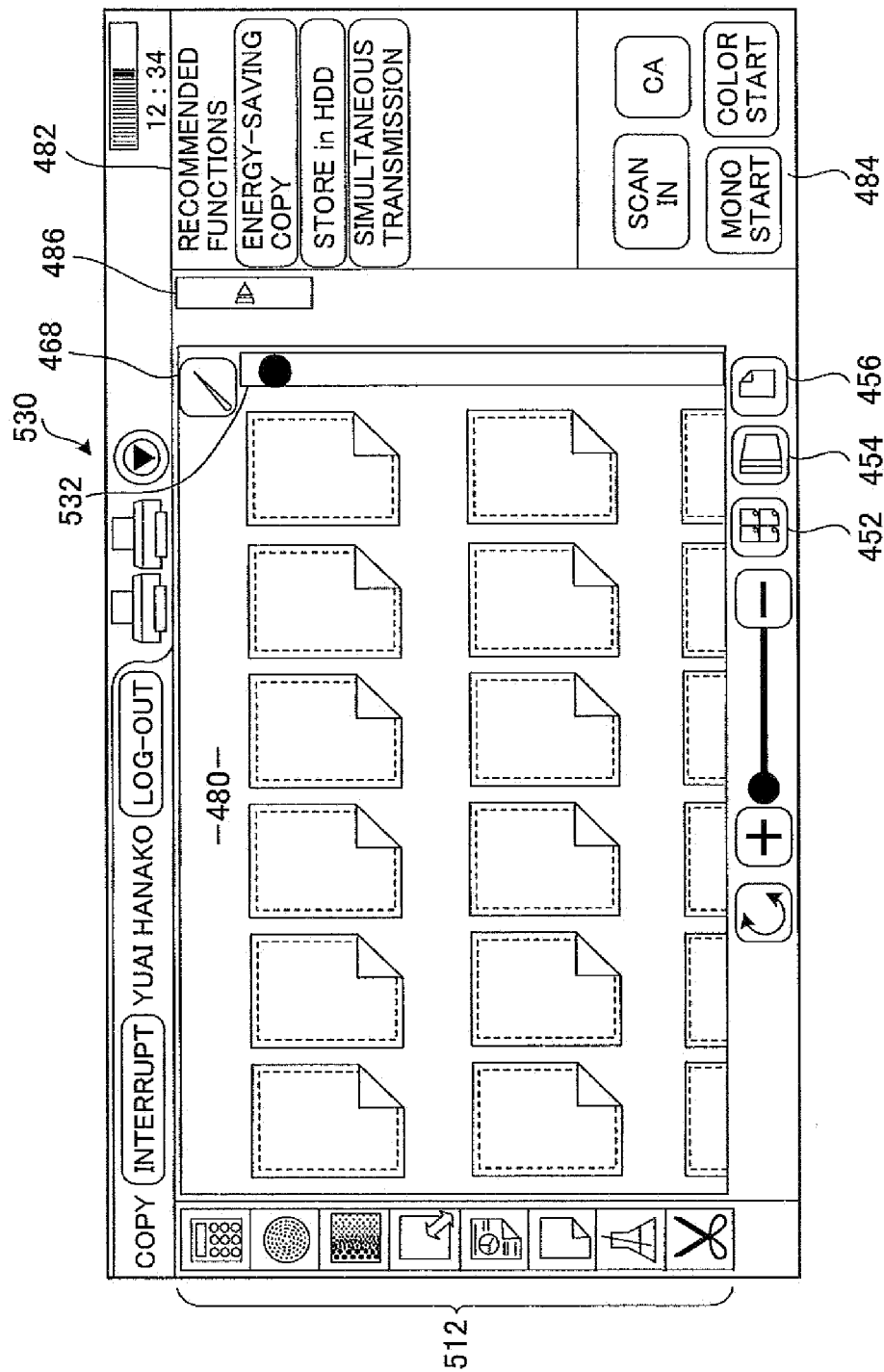
FIG. 9 is an illustrative diagram showing a state of partitioned display regions in document display mode in a preview representation of the image forming apparatus.

FIG. 6 is an illustrative diagram showing a state of partitioned display regions in fit mode in a preview representation of the image forming apparatus; FIG. 7 is an illustrative diagram showing a state of partitioned display regions in finish preview mode in a preview representation of the image forming apparatus; FIG. 8 is an illustrative diagram showing a state of partitioned display regions in image edition mode in a preview representation of the image forming apparatus; and FIG. 9 is an illustrative diagram showing a state of partitioned display regions in document display mode in a preview representation of the image forming apparatus.

In image forming apparatus 100, control unit 120 (FIG. 1) has multiple image display modes, specifically, (1) fit mode, (2) finish preview mode, (3) image edition mode and (4) document display mode, to support the function of editing image data.

Now, the screen configuration of each image display mode using preview will be described.

Here, in any image display mode, the positions of the layout of preview region 480, function selecting region 410, action panel region 482 and task trigger region 484, displayed on touch panel display 130 (FIG. 1) are basically the same, though the width (the dimension in the longitudinal direction of touch panel display 130) varies depending on the frame.

(1) Fit Mode

In fit mode, a fit-to-screen frame 500 is displayed in touch panel display 130, as shown in FIG. 6. Fit-to-screen frame 500 is used to display a captured image when a scan-in operation is completed, for example.

Arranged in the center of fit-to-screen frame 500 is preview region 480. In this case, a preview image 502 of one page of document is displayed in the largest possible size within the preview region 480.

Arranged on the left side of preview region 480 is function selecting region 410.

In function selecting region 410, a group of function icons 512 and a group of texts 514 each explaining the function of individual function icon are displayed.

Arranged in the upper part on the right side of preview region 480 is action panel region 482. Task trigger region 484 is laid out under the action panel region.

When the right end of function selecting region 410 is flicked leftwards, function selecting region 410 retracts to the left side of the screen, so that only the group of function icons 512 is displayed. In other words, the group of texts 514 is eliminated. Also in this state, the user is able to recognize each function since the group of function icons 512 for function selection is displayed. Resultantly, the user can operate without confusion when selecting a function.

Then, as the right end of function selecting region 410 is flicked rightwards, function selecting region 410 pulled out rightwards. At this time, the background of function selecting region 410 becomes translucent so that the user can view the image in preview region 480. That is, the user can confirm the whole preview image when selecting a function. As a result, it is possible for the user to easily select an appropriate function.

When action panel folding button 486 is pressed, action panel region 482 is contracted rightwards and an unfolding button 522 (see FIG. 8) is displayed. As unfolding button 522 is pressed, action panel region 482 is expanded leftwards and displayed. This control is the same as in the display frame in other image display modes.

(2) Finish Preview Mode

In finish preview mode, a finish preview frame 510 is displayed in touch panel display 130, as shown in FIG. 7. Arranged in the center of finish preview frame 510 is preview region 480. In this case, preview images of multiple pages of documents are displayed in preview region 480.

On the left side of finish preview frame 510, function selecting region 410 (FIG. 6) is displayed in a contracted representation.

That is, only the group of function icons 512 without group of texts 514 is displayed in function selecting region 410. Arranged in the upper part on the right side of preview region 480 is action panel region 482. Task trigger region 484 is laid out under the action panel region.

Preview region 480 is displayed with the greater width by virtue of reduction of the width of function selecting region 410. Accordingly, when many images are arranged inside preview region 480 as in a finish preview representation, the whole configuration can be easily known. The Image arranged in the center of preview region 480 is displayed so large that the content can be fully confirmed.

In finish preview mode, only the group of function icons 512 is displayed without the group of texts 514. However, when the right edge of the group of function icons 512 is flicked rightwards, function selecting region 410 is unfolded rightwards from the group of function icons 512. After the unfolding, the group of texts 514 is displayed on the right side of the group of function icons 512, presenting a similar screen to that of fit-to-screen frame 500. In this case, function selecting region 410 is translucent. Therefore, the images in preview region 480 under function selecting region 410 can be seen through.

As a predetermined time has elapsed without any function icon or text operated, function selecting region 410 is retracted once again to return to the display of the group of function icons 512 alone. Also when execution of the function selected by the user is completed, function selecting region 410 is retracted to return to the display of the group of function icons 512 alone.

(3) Image Edition Mode (1D Mode)

In image edition mode, an image edition mode frame 520 is displayed in touch panel display 130, as shown in FIG. 8. Arranged in the center of image edition mode frame 520 is preview region 480. In this case, preview images of multiple pages of documents are arranged side by side and displayed in preview region 480. In image edition mode frame 520, it is possible to insert a blank page, delete a partial area of an image and perform other processes, in addition to mere display of images.

Similarly to finish preview frame 510 (FIG. 7), function selecting region 410 is displayed in a contracted representation on the left side of image edition mode frame 520. In function selecting region 410 only the group of function icons 512 is displayed.

In image edition mode frame 520, differing from finish preview frame 510, the action panel region 482 (FIG. 7) displayed in finish preview frame 510 is folded into the right side (in other words, retracted into the right side) with unfolding button 522 displayed instead.

As unfolding button 522 is pressed, action panel region 482 is expanded and displayed. Also in this case, action panel region 482 is displayed translucently so that preview region 480 under the action panel region can be recognized.

As a predetermined time has elapsed without any control given to action panel region 482, action panel region 482 is folded once again and replaced by unfolding button 522.

Similarly, as the left edge of contracted task trigger region 484 is flicked leftwards, task trigger region 484 is enlarged to the normal size. Also in this case, background of task trigger region 484 is made translucent.

When task trigger region 484 is displayed, the buttons inside task trigger region 484 can be operated. As a predetermined time has elapsed without any control given to task trigger region 484, task trigger region 484 is contracted and displayed.

In image edition mode, task trigger region 484 is also contracted and displayed in the right side of image edition mode frame 520. In this case, only part of buttons in task trigger region 484 can be seen. Since in image edition mode, priority is given to edition of page images, it does not matter if task trigger region 484 is displayed in a contracted manner.

Accordingly, in image edition mode, function selecting region 410, action panel region 482 and task trigger region 484 are displayed with their width contracted, so that most part of the display area of touch panel display 130 may be used for preview region 480. Hence, it is possible to easily perform edition of images and confirmation of images after edition.

Further, in image edition mode, in place of action panel region 482, unfolding button 522 and task trigger region 484 are displayed in a contracted manner on the upper and lower right of the screen, respectively. This enables the user to recognize the positions of action panel region 482 and task trigger region 484 during editing images, so that the user can do a job of editing comfortably.

(4) Document Display Mode

In document display mode, a document display mode 530 is displayed in touch panel display 130, as shown in FIG. 9. Arranged in the center of document display mode frame 530 is preview region 480. In this case, multiple captured page images are arranged matrix-wise in preview region 480.

On the left side of document display mode frame 530, function selecting region 410 (FIG. 6) is displayed in a contracted representation.

In function selecting region 410, only the group of function icons 512 without group of texts 514 is displayed. Action panel region 482 and task trigger region 484 are normally displayed in the same manner as in fit-to-screen frame 500 (FIG. 6).

The area of preview region 480 becomes greater than that in fit-to-screen frame 500, and a greater number of pages can be displayed. In the present embodiment, multiple images are arrayed in conformity with the width of preview region 480. When there are many images so that part of them cannot be displayed, a scroll bar 532 is displayed along the right edge of preview region 480. By operating scroll bar 532, it is possible to move the images displayed in preview region 480 up and down. It is also possible to move the images up or down by flicking the screen upwards or downwards.

Next, the configuration of control unit 120 in image forming apparatus 100 of the present embodiment will be described with reference to the drawings.

Figure 10:
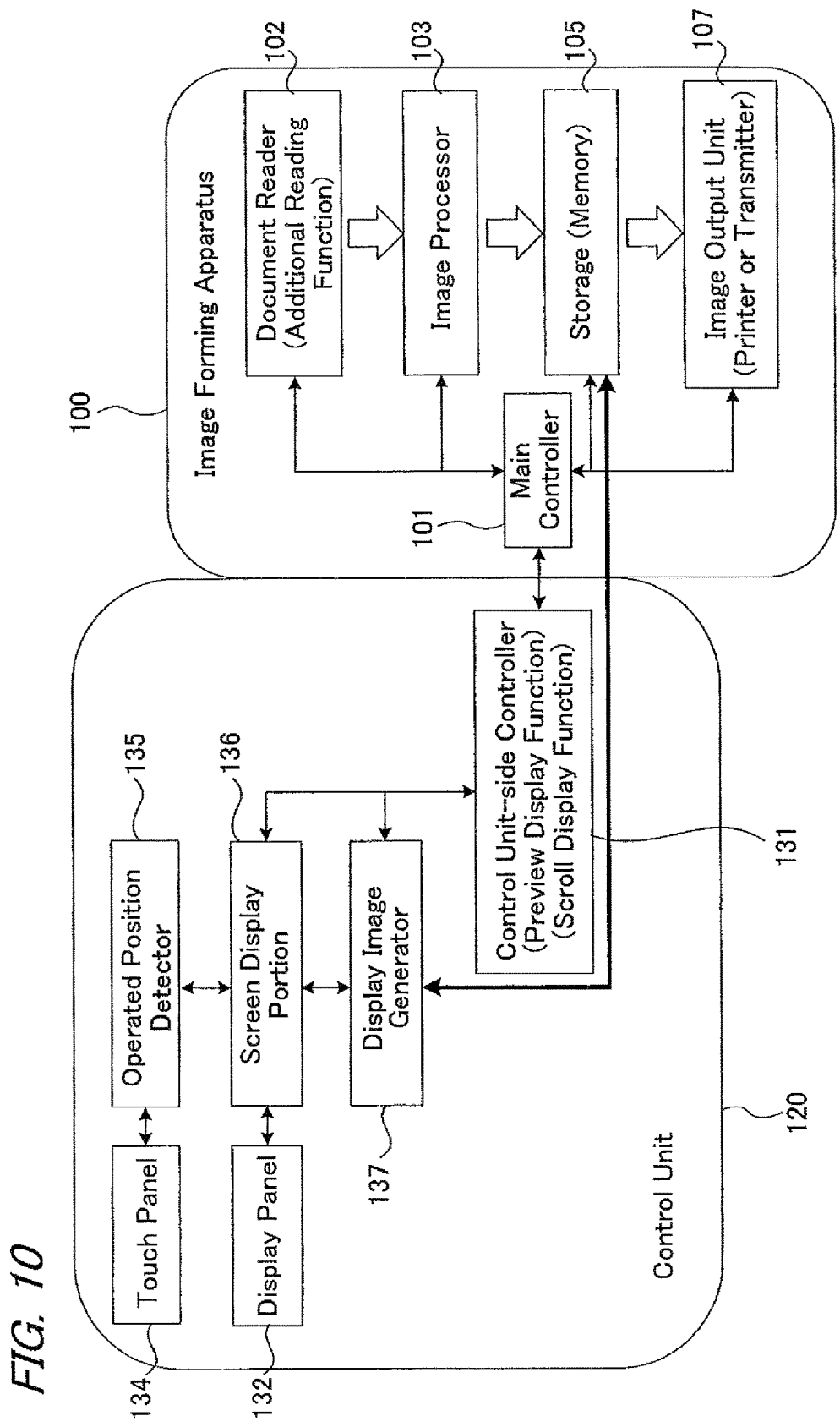
FIG. 10 is a block diagram showing a control unit configuration in the image forming apparatus.
Figure 11:
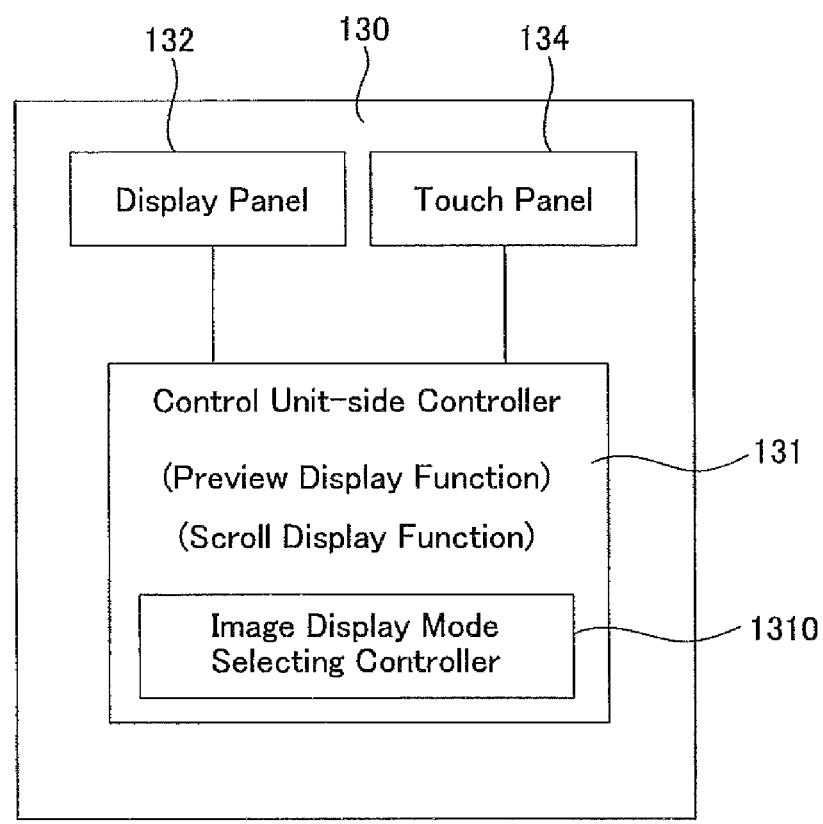
FIG. 11 is a block diagram showing a touch panel display configuration of the control unit.

FIG. 10 is a block diagram showing a control unit configuration in the image forming apparatus of the present embodiment. FIG. 11 is a block diagram showing a touch panel display configuration of the control unit.

As shown in FIG. 10, control unit 120 according to the present embodiment includes, in addition to display panel 132 and touch panel 134, an operated position detector 135, a screen display portion 136, a display image generator 137 and control unit-side controller (display controller) 131 for controlling processing and operation in control unit 120.

Image forming apparatus 100 includes document reader 102 for receiving input of image data, an image processor 103, a storage 105 for storing image data input through document reader 102 and an image output unit 107 such as a printer, transmitter or the like for outputting images, all being operated and controlled by a main controller 101.

Document reader 102 has an additional reading function which enables additional reading (additional input) of additional documents after completion of reading of desired documents (image data).

Operated position detector 135 detects the operated position on touch panel 134.

Screen display portion 136 displays an image formed by display image generator 137 on display panel 132 and displays the frame corresponding to each of the multiple image display modes.

Display image generator 137 prepares a predetermined image based on image data input to the main body of image forming apparatus 100, following instructions from control unit-side controller 131 and also has a function of forming images in their finished state in accordance with the settings for the finishing process.

Control unit-side controller 131 is connected to main controller 101 of the main body of image forming apparatus 100 and functions as a controller in touch panel display 130.

Now, control unit-side controller 131 will be described in detail.

As shown in FIG. 11, control unit-side controller 131 has a preview display function of giving display images based on the documents scanned by document reader 102 on touch panel display 130 in a preview representation and a scroll display function of multiple pages of display images given in a preview representation in a movable manner.

Further, control unit-side controller 131 has an image display mode selecting controller 1310.

Image display mode selecting controller 1310 has a function which, when the user selects a desired function, selects an image display mode suited to the function the user wants from the multiple image display modes, in accordance with the user's operation of selecting a function, and displays the display frame corresponding to the image display mode, on touch panel display 130.

Image display mode selecting controller 1310 also has a function which, if one page image representation or two page image representation (so-called spread representation) has been given on touch panel display 130 when the user selects a desired function, changes the display to an image display mode for displaying images of more than two pages in a preview representation, in accordance with the user's operation of selecting a function.

In the present embodiment, the user's operations of selecting a desired function should include the operation of selecting or touching an image given in a preview representation on touch panel display 130 with the finger and moving it, or a flicking operation by touching the image with the finger and sweeping it lightly.

Further, the user's operations of selecting a desired function should include the operation of selecting or touching an image to be edited and sliding the image either leftwards or rightwards on touch panel display 130.

Next, the cases where the display frame in image forming apparatus 100 changes by user's operation on touch panel display 130 when the user selects a desired function, will be described taking an example with reference to the drawings.

EXAMPLE

This example shows a case where, upon edition of moving an image to be edited in image forming apparatus 100, the display screen being in fit mode changes its mode in accordance with the user's operation on touch panel display 130.

Figure 12A:
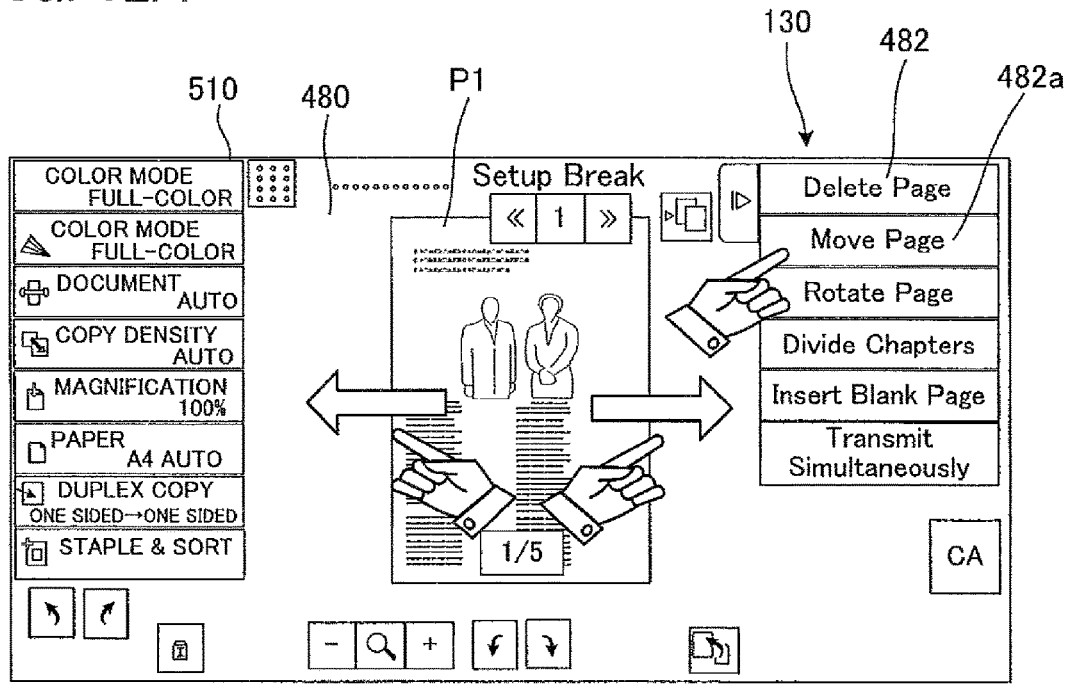
FIG. 12A is an illustrative view showing one example of a display screen when the screen display mode is set in fit mode in the image forming apparatus of an embodiment; and, FIG. 12B is an illustrative view showing one example of a display screen when the screen display mode has been switched into image edition mode (1D mode) in the image forming apparatus.
Figure 12B:
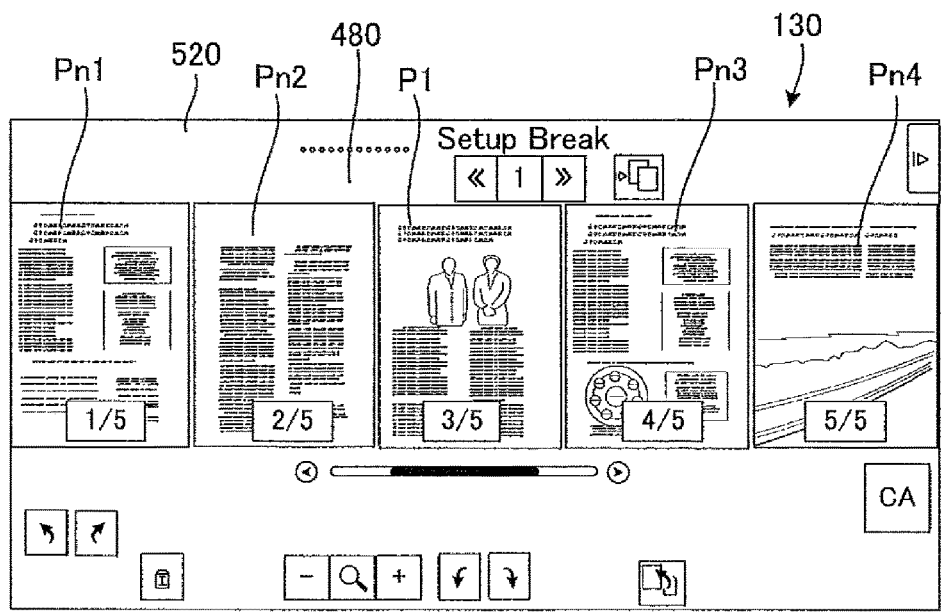

FIG. 12A is an illustrative view showing one example of a display screen when the screen display mode is in fit mode in the image forming apparatus of the example. FIG. 12B is an illustrative view showing one example of a display screen when the screen display mode has been switched into image edition mode (1D mode) in the image forming apparatus.

In the example, in image forming apparatus 100, fit-to-screen frame 500 in fit mode is displayed on touch panel display 130, as shown in FIG. 12A.

In preview region 480 of fit-to-screen frame 500, an image P1 to be edited (which will be referred to hereinbelow as "target image") is displayed in a preview representation.

Target image P1 is a display image that is formed based on image data of one page among the image data of multiple pages input in image forming apparatus 100.

When target image P1 is moved (or inserted), the target image P1 displayed on fit-to-screen frame 500 is flicked (by touching and sliding) either leftwards or rightwards. As a result, control unit-side controller 131 (FIGS. 10 and 11) recognizes that target image P1 should be moved in the horizontal direction on the interactive screen. Then, image display mode selecting controller 1310 (FIG. 11) selects the image edition mode which is the most suitable to move the image and then displays image edition mode frame 520 corresponding to image edition mode, as shown in FIG. 12B.

In image edition mode frame 520, multiple images (Pn1, Pn2, Pn3 . . . ) associated with target image P1 are displayed so as allow the user to recognize the arrangement of the input image data.

To select the place to which target image P1 is moved (or inserted), the user flicks image edition mode frame 520 either leftwards or rightwards so as to scroll the preview image of multiple images (Pn1, Pn2, Pn3 . . . ) in either left or right direction and find the target position.

When the target position (located between image Pn2 and image Pn3 in the present embodiment) is selected on image edition mode frame 520, for example double-tapping at the target position with the finger selects and determines the target position. As a result, target image P1 is laid out and displayed between image Pn2 and image Pn3 on image edition mode frame 520, as shown in FIG. 12B.

According to the example, when target image P1 displayed on fit-to-screen frame 500 is moved (inserted), mere touching and sliding of target image P1 without performing any control of switching the display screen, enables automatic selection of the most suitable image edition mode for image movement, hence it is possible to display image edition mode frame 520 corresponding to the image edition mode. As a result, the multiple images (Pn1, Pn2, Pn3 . . . ) associated with target image P1 can be displayed, whereby it is possible for the user to easily move or insert target image P1 to the target position.

Though, in the above example, the display screen is changed into image edition mode frame 520 in which multiple images are arrayed in the horizontal direction, by touching and sliding target image P1 in the horizontal direction, the display screen may be changed into image edition mode frame 520 in which multiple images are arranged in the vertical direction, by, for example, touching and sliding target image P1 in the vertical direction.

Further, in the example, the function the user wants, or the moving function, is actuated by touching and sliding target image P1 in the horizontal direction. However, a function selecting pane is displayed in action panel region 482 so that a desired function item key in the function selecting pane may be selected, as shown in FIG. 12A.

In the function selecting pane in FIG. 12, function item keys such as "Delete Page", "Move Page", "Rotate Page", "Divide Chapters", "Insert Blank Page" and "Transmit Simultaneously" are arranged, and the moving function can be actuated by touching the "Move Page" key 482a.

Further, in the example, when the user touches and slides target image P1, the display screen on touch panel display 130 is switched from fit-to-screen frame 500 to image edition mode frame 520. However, switching of the display screen is not limited to this.

As a variational example, when, for example, target image P1 belongs to a display image for duplex printing in "2-in-1" layout for arranging two document image on one page of printout, the display screen is adapted to switch to finish preview frame 510, as shown in FIG. 7.

In this way, image display mode selecting controller 1310 can select the image display mode that is most suitable to support the style (one-sided printing, duplex printing, etc.) of edited images and can display its frame.

As configured above, according to the above embodiment, example and variational example, in image forming apparatus 100 including control unit 120 having a function of displaying images to be output based on input image data in a preview representation, control unit-side controller 131 for controlling the processing and operation of control unit 120 is equipped with image display mode selecting controller 1310, whereby when the user performs image edition, the most suitable image display mode that supports the function and style of edited images the user wants can be selected from multiple image display modes, in accordance with the user's function selecting operation (e.g., an action of moving an image to be edited by touching and sliding), so as to give the associated display of the selected mode on touch panel display 130. As a result, it is possible to clarify the positional relationship of the target image to be edited relative to other images as well as to ease image editing operations, hence it is possible to realize an image forming apparatus that is improved in operativity.

The above embodiment and examples were described taking cases in which control unit 120 according to the present invention is applied to image forming apparatus 100 shown in FIG. 1. However, as long as it is an image forming apparatus that includes a control unit (image display control device) including multiple image display modes for editing functions of image data and having a function of providing preview display of images to be output, the invention can be applied to any other image forming apparatus and the like, not limited to the image forming apparatus and copier having the configuration described above.

Having described heretofore, the present invention is not limited to the above embodiment and example, various changes can be made within the scope of the appended claims. That is, it is apparent that various kinds of variations and modified examples will occur to those skilled in the art within the scope of the appended claims. That is, any embodied mode obtained by combination of technical means modified as appropriate without departing from the spirit and scope of the present invention should be included in the technical art of the present invention.

What is claimed is:

1. An image display control device comprising:
   an image display screen including at least an image display portion configured to display an image and a function selecting display portion configured to display a function selecting menu including functions to be performed in relation to the image; and
   a display controller configured to, when one mode among a plurality of modes for displaying the image is selected, change both a size of a region showing the function selecting display portion and a content shown in the function selecting display portion.

2. The image display control device according to claim 1, wherein
   the function selecting display portion includes icons and texts showing the function selecting menu, and
   the display controller is configured to change the size of the region showing the function selecting display portion by displaying only the icons or displaying the icons and the texts.

3. The image display control device according to claim 2, wherein the display controller switches a display configuration of the function selecting display portion, between a first display configuration in which only the icons are displayed and a second display configuration in which the icons and the texts are displayed, by a gesture control including a flicking operation.

4. The image display control device according to claim 3, wherein when the display configuration of the function selecting display portion is switched from the first display configuration to the second display configuration, the function selecting display portion is displayed translucently.

5. The image display control device according to claim 1, wherein the image display screen further includes an information display portion configured to display information including suggestions for operation and control.

6. The image display control device according to claim 5, wherein the information display portion displays a folding button, which is operated when the information display portion should be displayed to decrease in a size of a region showing the information display portion.

7. The image display control device according to claim 6, wherein when the folding button is pressed, the size of the region showing the information display portion is decreased and a button is displayed.

8. The image display control device according to claim 5, wherein the information display portion is folded and a button is displayed instead.

9. The image display control device according to claim 1, wherein the image display screen further includes an operation starting item display portion configured to display an item for starting an operation to the image.

10. The image display control device according to claim 9, wherein the operation starting item display portion is displayed to decrease in a size of a region showing the operation starting item display portion.

11. The image display control device according to claim 10, wherein the operation starting item display portion, which is displayed to decrease in the size of the region, is displayed as a normal size, by a gesture control including a flicking operation.

12. An image forming apparatus comprising:
    an image display control device according to claim 1; and,
    an image forming portion configured to form the image on a recording medium.

13. The image display control device according to claim 1, wherein the plurality of modes includes one page of document display mode and a plurality of pages of document display mode.

* * * * *